US011870136B2

(12) United States Patent
Welch

(10) Patent No.: US 11,870,136 B2
(45) Date of Patent: Jan. 9, 2024

(54) CHASSIS SLOT ANTENNA

(71) Applicant: Rosemount Aerospace Inc., Burnsville, MN (US)

(72) Inventor: Stephen Welch, Minneapolis, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 17/653,411

(22) Filed: Mar. 3, 2022

(65) Prior Publication Data

US 2023/0282968 A1 Sep. 7, 2023

(51) Int. Cl.
*H01Q 1/28* (2006.01)
*H01Q 1/22* (2006.01)
*H01Q 13/10* (2006.01)

(52) U.S. Cl.
CPC ........... *H01Q 1/286* (2013.01); *H01Q 1/2291* (2013.01); *H01Q 13/10* (2013.01)

(58) Field of Classification Search
CPC .... H01Q 1/1221; H01Q 1/2291; H01Q 1/243; H01Q 1/48; H01Q 13/10
See application file for complete search history.

(56) References Cited

U.S. PATENT DOCUMENTS

| | | | | |
|---|---|---|---|---|
| 5,940,041 | A | 8/1999 | Koyama et al. | |
| 8,299,971 | B2 | 10/2012 | Talty et al. | |
| 8,912,958 | B2 | 12/2014 | Miyakawa | |
| 9,373,892 | B2 | 6/2016 | Yatabe et al. | |
| 9,774,091 | B2 | 9/2017 | Girard | |
| 9,812,770 | B2 | 11/2017 | Gavilan et al. | |
| 10,367,251 | B2 | 7/2019 | Hwang et al. | |
| 10,854,953 | B2 | 12/2020 | Romano et al. | |
| 2011/0006953 | A1 | 1/2011 | Chiang et al. | |
| 2016/0197398 | A1 * | 7/2016 | Scheim | H01Q 1/286 343/713 |
| 2019/0296442 | A1 | 9/2019 | Barrera et al. | |
| 2020/0259258 | A1 * | 8/2020 | Amiri | H01Q 5/378 |

OTHER PUBLICATIONS

Extended European Search Report for EP Application No. 23159933.3, dated Jun. 23, 2023, pp. 8.

* cited by examiner

*Primary Examiner* — Robert Karacsony
(74) *Attorney, Agent, or Firm* — Kinney & Lange, P. A.

(57) ABSTRACT

A wireless communication device includes a metallic chassis, a slot extending through a sidewall of the metallic chassis, and a slot antenna secured to an inner surface of the metallic chassis and adjacent the slot. The slot antenna is integrated into the metallic chassis, giving the appearance and function of an internal antenna used with wireless communication devices having non-metallic chassis.

20 Claims, 2 Drawing Sheets

CHASSIS SLOT ANTENNA

BACKGROUND

The present invention relates to wireless communication device antennas and, more particularly, to slot antennas used in wireless communication devices having metallic chassis.

Many devices with wireless communication capabilities are required to employ a metal chassis or enclosure to protect the device from damage in the harsh environments in which the devices operate. For example, some devices with wireless communications capabilities are required to have a metal chassis to protect the internal circuitry from environments with high electromagnetic interference (EMI), extreme temperatures, and high humidity levels, among other environmental factors. Traditionally, when a metal chassis is used, the antennas for wireless communication must be mounted externally, usually in the form of a dipole or whip antenna. The antennas must be mounted external of the metal chassis because the metal chassis can interfere with the communication signals if the antennas were positioned within traditional metal chassis. Externally mounted antennas suffer from a number of drawbacks such as higher cost, complicated installation, more space needed for the device, and poor aesthetics, among other drawbacks. As such, there is a need for an antenna that is integrated into the metal chassis itself, giving the appearance and function of an internal antenna.

SUMMARY

According to one aspect of the disclosure, a slot antenna for use in a wireless communication device is disclosed. The slot antenna includes a printed circuit board coupled to a metallic chassis of the wireless communication device such that a conductive path extends between the printed circuit board and the metallic chassis. The printed circuit board includes a ground plane including a conductive layer and a resonator extending through the conductive layer of the ground plane. The slot antenna further includes an antenna positive feed terminal electrically coupled to a first side of the ground plane and extending across the resonator to a second side of the ground plane to an antenna negative feed terminal electrically coupled to the second side of the ground plane. A feed cable is electrically coupled at a first end to the antenna positive feed terminal and the antenna negative feed terminal and electrically coupled at a second end to internal circuitry positioned within the metallic chassis.

According to another aspect of the disclosure, a wireless communication device is disclosed. The wireless communication device includes a metallic chassis with a slot extending through a sidewall of the metallic chassis. The wireless communication device also includes a memory, a processor, an input port, and an output port positioned within the metallic chassis, such that the memory is electrically coupled to the processor, the input port, and the output port. Further, the wireless communication device includes a slot antenna coupled to an interior surface of the metallic chassis adjacent to and covering the slot of the metallic chassis. The slot antenna includes a printed circuit board positioned adjacent to the metallic chassis such that a conductive path extends between the printed circuit board and the metallic chassis. The printed circuit board includes a ground plane including a conductive layer and a resonator extending through the conductive layer of the ground plane. The resonator in the conductive layer and the slot in the metallic chassis are configured to produce a resonant frequency when a radio frequency.

DETAILED DESCRIPTION

Wireless communication devices are used to send and receive communication signals at various frequencies for various applications. Some wireless communication devices are used on aircraft to send and receive communication signals to ground control, other aircraft, components of the aircraft, etc. A wireless communication device for use on an aircraft can experience harsh operating conditions during flight of the aircraft. As such, wireless communication devices for use in aircraft require robust chassis or enclosures, such as metallic chassis, to protect the wireless communication device from the harsh operating conditions. Traditional wireless communication devices with metallic chassis include externally mounted antennas to send and receive communication signals, usually in the form of a dipole or whip antenna. The following disclosure presents a solution to removing the need for externally mounted antennas on wireless communication devices with metallic chassis by integrating a slot antenna into the metallic chassis, giving the appearance and function of an internal antenna used with wireless communication devices having non-metallic chassis. In some examples, the wireless communication device can include a metallic chassis, a slot extending through the metallic chassis, and a slot antenna secured to an inner surface of the metallic chassis and adjacent the slot within the metallic chassis. The slot antenna is configured to send and receive communications signals from within the metallic chassis, protecting the slot antenna from the harsh operating conditions during flight of the aircraft.

Figure 1:
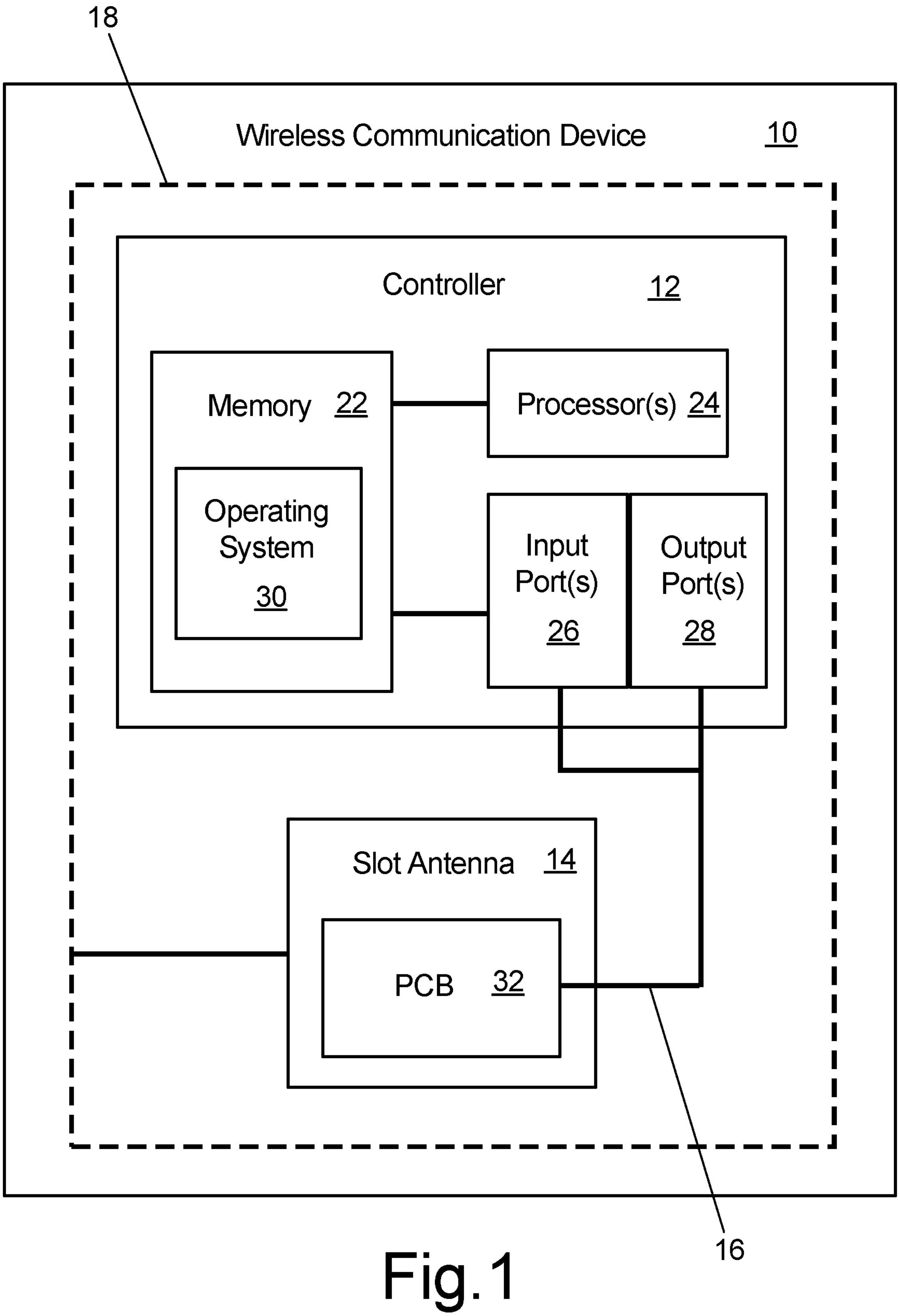
FIG. 1 is a schematic block diagram illustrating a wireless communication device including a slot antenna in accordance with an embodiment.
Figure 2:
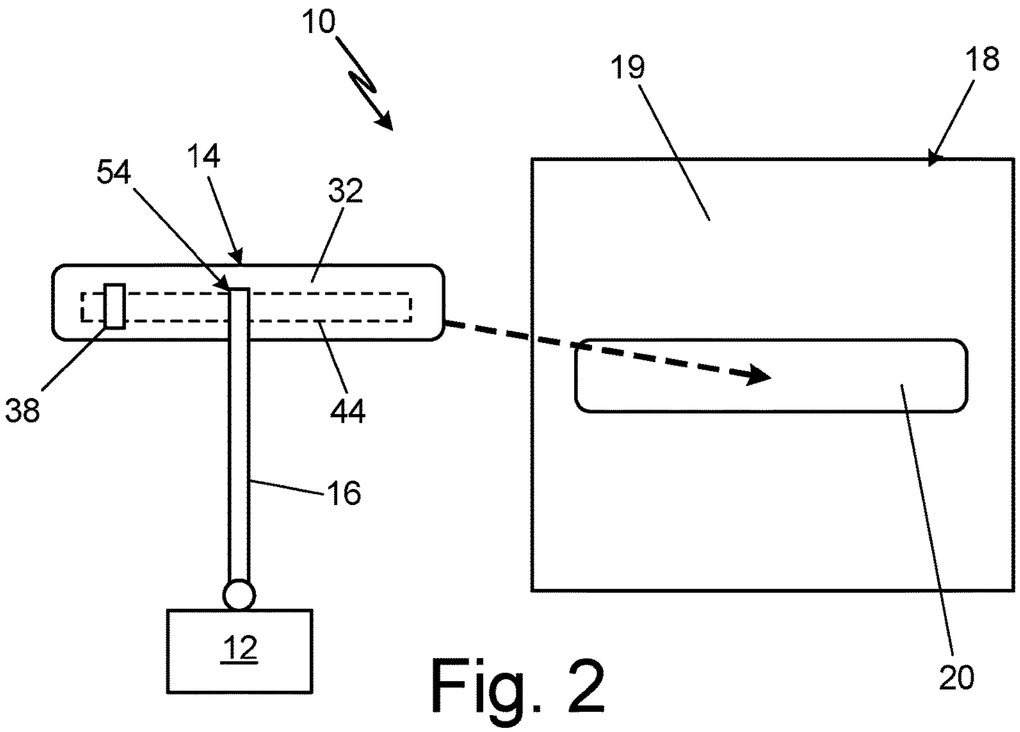
FIG. 2 is an exploded view illustrating an example slot antenna and an example metallic chassis of the wireless communication device of FIG. 1.
Figure 3:
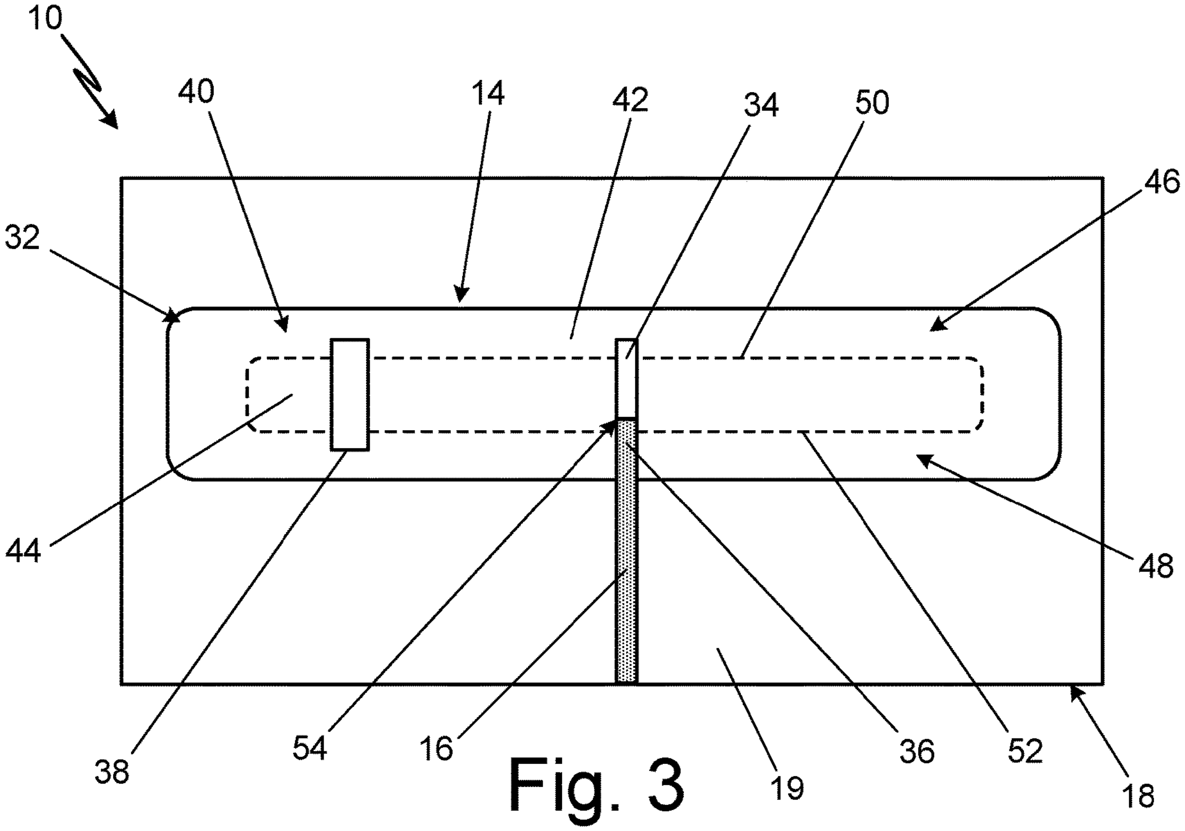
FIG. 3 is an assembled view illustrating the example slot antenna and the example metallic chassis shown in FIG. 2.

FIG. 1 is a schematic block diagram illustrating wireless communication device 10 including slot antenna 14. FIG. 2 is an exploded view illustrating slot antenna 14 and metallic chassis 18 of wireless communication device 10. FIG. 3 is an assembled view illustrating slot antenna 14 and metallic chassis 18. FIGS. 1-3 will be discussed together. In some examples, wireless communication device 10 can be used on an aircraft to send and receive communication signals. Further, wireless communication device 10 will hereinafter be referred to as device 10. As shown in FIGS. 1-2, device 10 includes controller 12 communicatively coupled to slot antenna 14 through feed cable 16. It is to be understood that controller 12 can also be referred to as internal circuitry and that controller 12 and internal circuitry are interchangeable throughout the following disclosure. Device 10 also includes metallic chassis 18 with slot 20 (FIG. 2) extending fully through a sidewall of metallic chassis 18, such that an opening exists in at least one sidewall of metallic chassis 18. Metallic chassis 18 can be an enclosure of any shape and size and metallic chassis 18 can be any conductive metallic material that can efficiently transfer or conduct electrical signals. In the example shown in FIG. 2, slot 20 is a generally rectangular shaped aperture that extends through a sidewall of metallic chassis 18. In another example, slot 20 can be an aperture of any geometrical shape. The shape, size, and location of slot 20 within metallic chassis 18 can affect the resonant frequency produced by slot 20, discussed further below. Controller 12 (a.k.a. internal circuitry) and slot antenna 14 are both positioned within metallic chassis 18 to protect the respective components from the harsh operating conditions present during flight of an aircraft.

Referring to FIG. 1, controller 12 includes memory 22, processor(s) 24, input port(s) 26, and output port(s) 28. Memory 22 is communicatively coupled to each of processor(s) 24, input port(s) 26, and output port(s) 28 and memory 22 is configured to send and receive communication/data signals from each respective component. Further, memory 22 of controller 12 can include operating system 30 stored within memory 22. In certain examples, controller 12 can include more or fewer components than components 22, 24, 26, and 28. Processor(s) 24, in one example, are configured to implement functionality and/or process instructions for execution within controller 12. For instance, processor(s) 24 can be capable of processing instructions stored in memory 22. Examples of processor(s) 24 can include any one or more of a microprocessor, a controller, a digital signal processor (DSP), an application specific integrated circuit (ASIC), a field-programmable gate array (FPGA), or other equivalent discrete or integrated logic circuitry. Controller 12, in some examples, also includes input port(s) 26 and output port(s) 28. Input port(s) 26 are configured to receive communication signals from slot antenna 14 and the received communication signals can be stored within memory 22 for processing by processor(s) 24. Output port(s) 28, in one example, are configured to send communication signals from controller 12 to slot antenna 14. Output port(s) 28, in another example, are configured to provide additional data through output port(s) 28 to other output devices. Input port(s) 26 and output port(s) 28 can be any electrical connector capable of transferring communication signals. In one example, input port(s) 26 and output port(s) can be standard U.FL radio frequency connectors.

Memory 22 can be configured to store information within controller 12 during operation of device 10. Memory 22, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 22 is a temporary memory, meaning that a primary purpose of memory 22 is not long-term storage. Memory 22, in some examples, is described as volatile memory, meaning that memory 22 does not maintain stored contents when power to controller 12 is turned off. Examples of volatile memories can include random access memories (RAM), dynamic random-access memories (DRAM), static random-access memories (SRAM), and other forms of volatile memories. In some examples, memory 22 is used to store program instructions for execution by processor(s) 24. Memory 22, in one example, is used by software or applications running on controller 12 (e.g., a software program implementing a system architecture) to temporarily store information during program execution. Memory 22, in some examples, also includes one or more computer-readable storage media. Memory 22 can be configured to store larger amounts of information than volatile memory. Memory 22 can further be configured for long-term storage of information. In some examples, memory 22 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 12, in some examples, is communicatively coupled to slot antenna 14 through feed cable 16. Feed cable 16 can be any electrical cable capable of transferring communication signals between slot antenna 14 and the internal circuity of device 10. Device 10, in one example, utilizes slot antenna 14 to communicate with external devices via one or more networks, such as one or more wireless or wired networks or both. Slot antenna 14, in some examples, can be a radio frequency transceiver or other device used to transmit and/or receive radio signals, including but not limited to Bluetooth, 3G, 4G, 5G, and Wi-Fi signals, or any other type of device that can send and receive radio signals. Slot antenna 14 is positioned within and coupled to metallic chassis 18.

Referring to FIGS. 2-3, an interior portion of device 10 is shown, viewing from an interior of device 10 towards the exterior of device 10. As shown, slot antenna 14 is coupled to interior surface 19 of a sidewall of metallic chassis 18 such that slot antenna 14 is positioned adjacent slot 20 of metallic chassis 18. More specifically, slot antenna 14 is coupled to metallic chassis 18 such that slot antenna 14 is positioned over and covers slot 20 of metallic chassis 18. In some examples, slot antenna 14 is coupled to interior surface 19 of a sidewall of metallic chassis 18 through a conductive fastener, such as a conductive adhesive, a metallic screw, a metallic bolt, or the like. In other examples, slot antenna 14 is coupled to interior surface 19 of a sidewall of metallic chassis 18 through a non-conductive fastener, such as a non-conductive adhesive, a non-metallic screw, a non-metallic bolt, or the like. In either example, slot antenna 14 is coupled to metallic chassis 18 such that a conductive path extends between slot antenna 14 and metallic chassis 18, discussed further below.

Slot antenna 14 includes feed cable 16, printed circuit board 32, antenna positive feed terminal 34, antenna negative feed terminal 36, and tuning element 38. Slot antenna 14 is configured to produce a resonant frequency when a radio frequency current is provided to slot antenna 14, which then produces an electromagnetic wave at a specific frequency for sending communication signals to other components/devices. Printed circuit board 32 includes ground plane 40, which includes conductive layer 42 covered and surrounded by a non-conductive layer. In some examples, conductive layer 42 can be a copper foil or other conductive material and the non-conductive layer can be a glass-reinforced epoxy laminate material, such as an FR-4 composite material, or other non-conductive material. In the example shown, ground plane 40 of printed circuit board 32 is a thin and flat structure that extends adjacent and parallel to at least a portion of a sidewall of metallic chassis 18. In another example, ground plane 40 of printed circuit board 32 may not be perfectly parallel with a sidewall of metallic chassis 18, such that a first portion of ground plane 40 may be parallel with a sidewall of metallic chassis 18 and a second portion of ground plane 40 may not be parallel with a sidewall of metallic chassis 18. With that said, the following discussion will focus on the embodiment in which ground plane 40 is parallel with at least a portion of a sidewall of metallic chassis 18.

Printed circuit board 32 is positioned adjacent and communicatively coupled to interior surface 19 of a sidewall of metallic chassis 18 of device 10, such that a conductive path extends between printed circuit board 32 and metallic chassis 18. More specifically, the conductive contacts or elements of printed circuit board 32 contact (either directly or through a conductive fastener) metallic chassis 18 such that communication signals can transfer between printed circuit board 32 and metallic chassis 18. Printed circuit board 32 can be coupled to metallic chassis 18 through conductive or non-conductive fasteners, as described above with regards to slot antenna 14. The conductive path extending between printed circuit board 32 and metallic chassis 18 allows communication signals to transfer between printed circuit board 32 and metallic chassis 18, such that metallic chassis 18 acts as a ground for printed circuit board 32, discussed further below.

In some examples, as shown in FIGS. 2-3, printed circuit board 32 can be generally rectangular in shape. In other examples, printed circuit board 32 can have any geometrical shape. In some embodiments, printed circuit board 32 can have a shape that generally mirrors the shape of slot 20 of metallic chassis 18. Further, printed circuit board 32 can be slightly larger than slot 20 of metallic chassis 18, such that outer edges of printed circuit board 32 extend beyond the outer edges of slot 20. In other words, printed circuit board 32 can include a flat rectangular surface that has a greater area than a 2-dimensional cross-sectional area of slot 20, as shown in FIG. 2. Therefore, printed circuit board 32 can be larger than slot 20 such that printed circuit board 32 extends beyond the edges of slot 20 to fully cover slot 20 of metallic chassis 18 from the interior of metallic chassis 18.

Resonator 44 is an aperture or opening that extends fully through conductive layer 42. Resonator 44 is positioned generally in the center of ground plane 40 of printed circuit board 32. Resonator 44 extends through conductive layer 42 of printed circuit board 32 but not through the non-conductive layers of printed circuit board 32. As such, ground plane 40 is the area of conductive layer 42 surrounding resonator 44, and resonator 44 extends through conductive layer 42. In the example shown in FIG. 3, resonator 44 has a generally rectangular shape similar to that of printed circuit board 32, such that an outer edge of printed circuit board 32 and an outer edge of resonator 44 are concentric rectangles. Further, in some examples, resonator 44 can have a generally rectangular shape that mirrors the size and shape of slot 20 of metallic chassis 18. Resonator 44 in conductive layer 42 and slot 20 in metallic chassis 18 are configured to produce a resonant frequency when a radio frequency current is provided to printed circuit board 32 and slot antenna 14. In turn, the resonant frequency produces an electromagnetic wave at a specific frequency for sending communication signals outward from device 10. The size and shape of resonator 44 and slot 20 can be altered to produce a desired resonant frequency (depending on the application) and therefore electromagnetic waves at a specific communication frequency.

Referring to FIG. 3, slot antenna 14 includes antenna positive feed terminal 34 and antenna negative feed terminal 36. Antenna positive feed terminal 34 and antenna negative feed terminal 36 are both electrical connections that are coupled to ground plane 40 of printed circuit board 32. In the example shown, antenna positive feed terminal 34 is electrically and communicatively coupled to first side 46 of ground plane 40 and antenna negative feed terminal 36 is electrically and communicatively coupled to second side 48 of ground plane 40. First side 46 and second side 48 of ground plane 40 are separate areas of ground plane 40 that are positioned on opposite sides of resonator 44. As such, in the example shown in FIG. 3, first side 46 of ground plane 40 is the upper portion of ground plane 40 above resonator 44 and second side 48 of ground plane 40 is the lower portion of ground plane 40. Ground plane 40 could be rotated, and the upper portion and lower portion would switch, but in either case first side 46 and second side 48 are positioned opposite each other across resonator 44.

With that in mind and referring again to FIG. 3, antenna positive feed terminal 34 is electrically coupled to first side 46 of ground plane 40 and antenna positive feed terminal 34 extends across resonator 44 towards second side 48 of ground plane 40. Further, antenna positive feed terminal 34 is coupled to antenna negative feed terminal 36 at a location positioned over or above resonator 44 and antenna negative feed terminal 36 is coupled to second side 48 of ground plane 40. In other words, resonator 44 can be described as having first long edge 50 positioned adjacent first side 46 of ground plane 40 and second long edge 52 positioned adjacent second side 48 of ground plane. As shown, antenna positive feed terminal 34 is electrically coupled adjacent first long edge 50 of the rectangular shaped resonator 44 in conductive layer 42, and antenna negative feed terminal 36 is electrically coupled adjacent second long edge 52 of the rectangular shaped resonator 44 in conductive layer 42.

Antenna positive feed terminal 34 and antenna negative feed terminal 36 are coupled across resonator 44 to facilitate the production of a resonant frequency within resonator 44 and slot 20 of metallic chassis. As shown in FIG. 3, antenna positive feed terminal 34 and antenna negative feed terminal 36 are positioned generally centered along first long edge 50 and second long edge 52. In another examples, antenna positive feed terminal 34 and antenna negative feed terminal 36 can be positioned anywhere along first long edge 50 and second long edge 52. The specific location of antenna positive feed terminal 34 and antenna negative feed terminal 36 along resonator 44 (and first long edge 50 and second long edge 52) is fine tuned to produce a specific resonant frequency depending on the requirements and application of device 10.

More specifically, when a radio frequency current is supplied to antenna positive feed terminal 34 and antenna negative feed terminal 36 of slot antenna 14, the radio frequency current is excited and oscillates across resonator 44 of slot antenna 14 and slot 20 of metallic chassis 18 to produce a resonant frequency. Further, printed circuit board 32 and slot antenna 14 are conductively coupled to metallic chassis 18 such that the produced resonant frequency transfers from slot antenna 14 to metallic chassis 18, and metallic chassis 18 is effectively a larger ground structure for printed circuit board 32 and slot antenna 14. Metallic chassis 18 being used as a larger ground structure for slot antenna 14 amplifies the communication signal and an electromagnetic wave is transferred at a specific frequency for communicating with other communication devices set to that specific frequency. As such, slot antenna 14 can be positioned within metallic chassis 18 and still transfer communications signals from within metallic chassis 18 by utilizing metallic chassis 18 as part of the antenna, rather than metallic chassis 18 blocking or interfering with the communication signals as has previously occurred with metallic chassis and internal antennas.

Slot antenna 14 also includes feed cable 16 electrically coupled at a first end to printed circuit board 32 and electrically coupled at a second end to input port(s) 26 or other internal circuitry of device 10. In some examples, feed cable 16 can be electrically coupled at a first end to antenna negative feed terminal 36 and electrically coupled at a second end to internal circuitry positioned within metallic chassis 18. Further, in some examples, a first end of feed cable 16 can be soldered to excitation port 54 of printed circuit board 32. Excitation port 54 can be one or more of antenna positive feed terminal 34 and antenna negative feed terminal 36. Excitation port 54 is the transfer point for the communication signal to transfer between feed cable 16 and slot antenna 14. In some examples, a second end of feed cable 16 can include a radio frequency connector for connecting to the internal circuitry positioned within metallic chassis 18. In some examples, the radio frequency connector is a U.FL radio frequency connector. In other examples, the radio frequency connector can be any other connector capable of transferring communication signals. Feed cable 16 is configured to transfer communication signals between printed circuit board 32 of slot antenna 14 and the internal circuitry positioned within metallic chassis 18.

Slot antenna 14 can also include tuning element 38 positioned across resonator 44, but not all embodiments of slot antenna 14 will contain tuning element 38. In the examples shown in FIG. 3, tuning element 38 is coupled to printed circuit board 32, such that tuning element 38 is coupled to first side 46 of ground plane 40 and tuning element 38 extends across resonator 44 towards second side 48 of ground plane 40. Further, tuning element 38 is coupled to second side 48 of ground plane 40, such that tuning element 38 extends across resonator 44 and is coupled to both first side 46 and second side 48 of ground plane 40 of printed circuit board 32. In some examples, tuning element 38 can be permanently coupled to printed circuit board 32. In other examples, tuning element 38 can be removably coupled to printed circuit board 32, such that tuning element 38 can be coupled or removed from printed circuit board 32 as desired. Tuning element 38 reduces or stops the radio frequency current flowing through printed circuit board 32 and resonator 44 to alter the frequency of slot antenna 14. Tuning elements 38 can be added or removed at various location along resonator 44 of slot antenna 14 to change the resonant frequency of slot antenna 14, depending on the specific application of device 10 and the frequency requirements for each specific device 10. In some examples, tuning element 38 can be a resistor, a capacitor, an inductor, or a copper trace, among other options. As discussed, some example slot antennas 14 may not include tuning element 38 to alter the resonant frequency of slot antenna 14. Rather, some example slot antennas 14 may change the shape and size of resonator 44 to alter the resonant frequency of slot antenna 14.

Metallic chassis 18 with slot 20 allows slot antenna 14 to be coupled to interior surface 19 of metallic chassis 18, protecting slot antenna 14 from harsh operating environments. Further, slot 20 combined with printed circuit board 32 being conductively coupled to metallic chassis 18 allows slot antenna 14 to operate similar to internal antennas of previous wireless communication devices having non-metallic chassis. Further, slot antenna 14 allows for the wireless communications device 10 to be designed without an external antenna. Slot antenna 14 with printed circuit board 32 can be manufactured in high volume at low cost, reducing the overall cost of wireless communication device 10. Device 10 including slot antenna 14 can be sold to consumers as an assembled product, and therefore it removes the complexity associated with assembling and attaching external antennas to a device. In addition, the internal slot antenna 14 removes the bulkiness associated with external antennas, resulting in a more compact and aesthetically pleasing wireless communication device. Slot antenna 14 is also advantageous over previous antennas because slot antenna 14 can be configured and tuned for different resonant frequencies by adding or removing tuning element 38, by changing the size and dimensions of resonator 44 and/or slot 20, and by adjusting the location of antenna positive feed terminal 34 and antenna negative feed terminal 36 along resonator 44. The ability to alter the resonant frequencies produced by slot antenna 14 gives the integrator flexibility in radio and technology selection and a wider range of possibilities for device 10. Slot antenna 14 of device 10 is configured to send and receive communications signals from within metallic chassis 18, protecting slot antenna 14 from the harsh operating conditions during flight of the aircraft.

Discussion of Possible Embodiments

The following are non-exclusive descriptions of possible embodiments of the present invention.

A slot antenna for use in a wireless communication device, the slot antenna comprising: a printed circuit board coupled to a metallic chassis of the wireless communication device such that a conductive path extends between the printed circuit board and the metallic chassis, the printed circuit board comprising: a ground plane comprising a conductive layer and a resonator extending through the conductive layer of the ground plane; an antenna positive feed terminal electrically coupled to a first side of the ground plane and extending across the resonator to a second side of the ground plane to an antenna negative feed terminal electrically coupled to the second side of the ground plane; and a feed cable electrically coupled at a first end to the antenna positive feed terminal and the antenna negative feed terminal and electrically coupled at a second end to internal circuitry positioned within the metallic chassis.

The slot antenna of the preceding paragraph can optionally include, additionally and/or alternatively, any one or more of the following features, configurations and/or additional components:

The ground plane of the printed circuit board extends adjacent and parallel to at least a portion of the metallic chassis.

The conductive path between the printed circuit board and the metallic chassis allows communication signals to transfer from the printed circuit board to the metallic chassis such that the metallic chassis acts as a ground for the printed circuit board.

The printed circuit board is coupled to an interior surface of the metallic chassis such that the printed circuit board extends over and covers a slot within a sidewall of the metallic chassis.

The printed circuit board is generally rectangular in shape and a slot within a sidewall of the metallic chassis is generally rectangular in shape, and wherein an area of a rectangular surface of the printed circuit board is greater than an area of the rectangular shaped slot.

The resonator in the conductive layer is generally rectangular in shape; the antenna positive feed terminal is electrically coupled to a first long edge of the rectangular shaped resonator in the conductive layer; and the antenna negative feed terminal is electrically coupled to a second long edge of the rectangular shaped resonator in the conductive layer.

The resonator in the conductive layer facilitates a resonant frequency between the antenna positive feed terminal and the antenna negative feed terminal when a radio frequency current is provided to the printed circuit board, producing an electromagnetic wave at a frequency.

The frequency of the electromagnetic wave produced by the resonator can be altered by changing the coupling locations of the antenna positive feed terminal and the antenna negative feed terminal along the resonator.

A tuning element coupled to the printed circuit board, wherein the tuning element is coupled to a first side of the ground plane and the tuning element extends across the resonator and is coupled to a second side of the ground plane, and wherein the tuning element is configured to alter the frequency of the slot antenna.

The first end of the feed cable is soldered to an excitation port of the printed circuit board, and wherein the second end of the feed cable includes a radio frequency connector for connecting to the internal circuitry positioned within the metallic chassis.

The following are non-exclusive descriptions of possible embodiments of the present invention.

A wireless communication device comprising: a metallic chassis with a slot extending through a sidewall of the metallic chassis; a memory, a processor, an input port, and an output port positioned within the metallic chassis, wherein the memory is electrically coupled to the processor, the input port, and the output port; and a slot antenna coupled to an interior surface of the metallic chassis adjacent to and covering the slot of the metallic chassis, the slot antenna comprising: a printed circuit board positioned adjacent to the metallic chassis such that a conductive path extends between the printed circuit board and the metallic chassis, the printed circuit board comprising: a ground plane comprising a conductive layer and a resonator extending through the conductive layer of the ground plane; wherein the resonator in the conductive layer and the slot in the metallic chassis are configured to produce a resonant frequency when a radio frequency current is provided to the printed circuit board, producing an electromagnetic wave at a frequency.

The wireless communication device of the preceding paragraph can optionally include, additionally and/or alternatively, any one or more of the following features, configurations and/or additional components:

An antenna positive feed terminal electrically coupled to a first side of the ground plane and extending across the resonator to a second side of the ground plane to an antenna negative feed terminal electrically coupled to the second side of the ground plane.

A feed cable electrically coupled at a first end to the antenna positive feed terminal and the antenna negative feed terminal and electrically coupled at a second end to the input port of internal circuitry positioned within the metallic chassis.

The printed circuit board is generally rectangular in shape; the slot in the metallic chassis is generally rectangular in shape; and the resonator extending through the conductive layer of the ground plane is generally rectangular in shape.

The antenna positive feed terminal is electrically coupled to a first long edge of the rectangular shaped resonator in the conductive layer; and the antenna negative feed terminal is electrically coupled to a second long edge of the rectangular shaped resonator in the conductive layer.

An area of a rectangular surface of the printed circuit board is greater than an area of the rectangular shaped slot in the metallic chassis, such that the printed circuit board extends beyond edges of the slot.

The slot antenna is coupled to an interior surface of the metallic chassis through a conductive fastener.

A tuning element coupled to the printed circuit board, wherein the tuning element is coupled to a first side of the ground plane and the tuning element extends across the resonator and is coupled to a second side of the ground plane, and wherein the tuning element is configured to alter the frequency of the slot antenna.

The conductive path between the printed circuit board and the metallic chassis allows communication signals to transfer from the printed circuit board to the metallic chassis such that the metallic chassis acts as a ground for the printed circuit board.

The ground plane of the printed circuit board extends adjacent and parallel to at least a portion of the metallic chassis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A slot antenna for use in a wireless communication device on an aircraft, the slot antenna comprising:

a printed circuit board coupled to a metallic chassis of the wireless communication device such that a conductive path extends between the printed circuit board and the metallic chassis and such that the metallic chassis forms a larger ground structure for the printed circuit board to amplify a communication signal and to transfer an electromagnetic wave at a specific frequency for communicating with other communication devices set to that specific frequency, the printed circuit board comprising:

a ground plane comprising a conductive layer and a resonator extending through the conductive layer of the ground plane;

an antenna positive feed terminal electrically coupled to a first side of the ground plane and extending across the resonator to a second side of the ground plane to an antenna negative feed terminal electrically coupled to the second side of the ground plane; and a feed cable electrically coupled at a first end to the antenna positive feed terminal and the antenna negative feed terminal and electrically coupled at a second end to internal circuitry positioned within the metallic chassis;

wherein the slot antenna is positioned on the aircraft and the slot antenna is configured to send and receive communications signals from within the metallic chassis thereby protecting the slot antenna from operating conditions during flight of the aircraft.

2. The slot antenna of claim 1, wherein the ground plane of the printed circuit board extends adjacent and parallel to at least a portion of the metallic chassis.

3. The slot antenna of claim 1, wherein the conductive path between the printed circuit board and the metallic chassis allows communication signals to transfer from the printed circuit board to the metallic chassis such that the metallic chassis acts as a ground for the printed circuit board.

4. The slot antenna of claim 1, wherein the printed circuit board is coupled to an interior surface of the metallic chassis such that the printed circuit board extends over and covers a slot within a sidewall of the metallic chassis.

5. The slot antenna of claim 1, wherein the printed circuit board is generally rectangular in shape and a slot within a sidewall of the metallic chassis is generally rectangular in shape, and wherein an area of a rectangular surface of the printed circuit board is greater than an area of the rectangular shaped slot.

6. The slot antenna of claim 1, wherein:

the resonator in the conductive layer is generally rectangular in shape;

the antenna positive feed terminal is electrically coupled to a first long edge of the rectangular shaped resonator in the conductive layer; and the antenna negative feed terminal is electrically coupled to a second long edge of the rectangular shaped resonator in the conductive layer.

7. The slot antenna of claim 6, wherein the resonator in the conductive layer facilitates a resonant frequency between the antenna positive feed terminal and the antenna negative feed terminal when a radio frequency current is provided to the printed circuit board, producing an electromagnetic wave at a frequency.

8. The slot antenna of claim 7, wherein the frequency of the electromagnetic wave produced by the resonator can be altered by changing the coupling locations of the antenna positive feed terminal and the antenna negative feed terminal along the resonator.

9. The slot antenna of claim 1 and further comprising a tuning element coupled to the printed circuit board, wherein the tuning element is coupled to a first side of the ground plane and the tuning element extends across the resonator and is coupled to a second side of the ground plane, and wherein the tuning element is configured to alter the frequency of the slot antenna.

10. The slot antenna of claim 1, wherein the first end of the feed cable is soldered to an excitation port of the printed circuit board, and wherein the second end of the feed cable includes a radio frequency connector for connecting to the internal circuitry positioned within the metallic chassis.

11. A wireless communication device for use on an aircraft comprising:

a metallic chassis with a slot extending through a sidewall of the metallic chassis;

a memory, a processor, an input port, and an output port positioned within the metallic chassis, wherein the memory is electrically coupled to the processor, the input port, and the output port; and a slot antenna coupled to an interior surface of the metallic chassis adjacent to and covering the slot of the metallic chassis, the slot antenna comprising:

a printed circuit board positioned adjacent to the metallic chassis such that a conductive path extends between the printed circuit board and the metallic chassis and such that the metallic chassis forms a larger ground structure for the printed circuit board to amplify a communication signal and to transfer an electromagnetic wave at a specific frequency for communicating with other communication devices set to that specific frequency, the printed circuit board comprising:

a ground plane comprising a conductive layer and a resonator extending through the conductive layer of the ground plane;

wherein the resonator in the conductive layer and the slot in the metallic chassis are configured to produce a resonant frequency when a radio frequency current is provided to the printed circuit board, producing an electromagnetic wave at a frequency; and wherein the slot antenna is positioned on the aircraft and the slot antenna is configured to send and receive communications signals from within the metallic chassis thereby protecting the slot antenna from operating conditions during flight of the aircraft.

12. The wireless communication device of claim 11 and further comprising an antenna positive feed terminal electrically coupled to a first side of the ground plane and extending across the resonator to a second side of the ground plane to an antenna negative feed terminal electrically coupled to the second side of the ground plane.

13. The wireless communication device of claim 12 and further comprising a feed cable electrically coupled at a first end to the antenna positive feed terminal and the antenna negative feed terminal and electrically coupled at a second end to the input port of internal circuitry positioned within the metallic chassis.

14. The wireless communication device of claim 12, wherein:

the printed circuit board is generally rectangular in shape;

the slot in the metallic chassis is generally rectangular in shape; and the resonator extending through the conductive layer of the ground plane is generally rectangular in shape.

15. The wireless communication device of claim 14, wherein the antenna positive feed terminal is electrically coupled to a first long edge of the rectangular shaped resonator in the conductive layer; and the antenna negative feed terminal is electrically coupled to a second long edge of the rectangular shaped resonator in the conductive layer.

16. The wireless communication device of claim 14, wherein an area of a rectangular surface of the printed circuit board is greater than an area of the rectangular shaped slot in the metallic chassis, such that the printed circuit board extends beyond edges of the slot.

17. The wireless communication device of claim 11, wherein the slot antenna is coupled to an interior surface of the metallic chassis through a conductive fastener.

18. The wireless communication device of claim 11 and further comprising a tuning element coupled to the printed circuit board, wherein the tuning element is coupled to a first side of the ground plane and the tuning element extends across the resonator and is coupled to a second side of the ground plane, and wherein the tuning element is configured to alter the frequency of the slot antenna.

19. The wireless communication device of claim 11, wherein the conductive path between the printed circuit board and the metallic chassis allows communication signals to transfer from the printed circuit board to the metallic chassis such that the metallic chassis acts as a ground for the printed circuit board.

20. The wireless communication device of claim 11, wherein the ground plane of the printed circuit board extends adjacent and parallel to at least a portion of the metallic chassis.

* * * * *